United States Patent
Kulkarni et al.

(10) Patent No.: US 12,507,633 B2
(45) Date of Patent: Dec. 30, 2025

(54) PANEL COMPRESSION SYSTEM FOR BALER IMPLEMENT

(71) Applicant: DEERE & COMPANY, Moline, IL (US)

(72) Inventors: Nikhil Kulkarni, Pune (IN); Satyanarayana Ps, Pune (IN)

(73) Assignee: DEERE & COMPANY, Moline, IL (US)

( * ) Notice: Subject to any disclaimer, the term of this patent is extended or adjusted under 35 U.S.C. 154(b) by 442 days.

(21) Appl. No.: 18/298,403

(22) Filed: Apr. 11, 2023

(65) Prior Publication Data

US 2024/0341239 A1 Oct. 17, 2024

(51) Int. Cl.
*A01F 15/04* (2006.01)
*A01F 15/08* (2006.01)
*B30B 9/30* (2006.01)

(52) U.S. Cl.
CPC ........ *A01F 15/046* (2013.01); *A01F 15/0825* (2013.01); *B30B 9/3025* (2013.01)

(58) Field of Classification Search
CPC .... A01F 15/046; A01F 15/04; A01F 15/0825; B30B 9/3025
See application file for complete search history.

(56) References Cited

U.S. PATENT DOCUMENTS

| | | | |
|---|---|---|---|
| 1,062,465 A | * | 5/1913 | Hill ........................ B30B 1/103 100/285 |
| 2,791,172 A | | 5/1957 | Russell |
| 2,823,603 A | * | 2/1958 | Collins ............... A01F 15/0825 100/192 |
| 4,037,528 A | | 7/1977 | White et al. |
| 10,945,377 B2 | | 3/2021 | Roth et al. |
| 11,051,455 B2 | | 7/2021 | Monbaliu et al. |
| 2017/0367267 A1 | | 12/2017 | Schrag et al. |
| 2021/0243956 A1 | | 8/2021 | Monbaliu et al. |

FOREIGN PATENT DOCUMENTS

| | | |
|---|---|---|
| EP | 0152970 A1 | 8/1985 |
| EP | 3316672 B1 | 10/2019 |

OTHER PUBLICATIONS

Extended European Search Report and Written Opinion issued in European Patent Application No. 24162531.8 dated May 15, 2024, in 07 pages.

* cited by examiner

*Primary Examiner* — Jimmy T Nguyen (57) ABSTRACT

A baler implement includes an upper compression panel and a first side compression panel both partially form a compression chamber. A compression frame is attached to a main frame. The compression frame is disposed adjacent to the upper compression panel. A first upper pivot link contacts the upper compression panel and is rotatably coupled to the compression frame for rotation about a first upper link axis. A first side pivot link contacts the first side compression panel and is rotatably coupled to the main frame for rotation about a first side link axis. A first actuator interconnects the first upper pivot link and the first side pivot link. Retraction of the first actuator simultaneously moves the upper compression panel in a first vertical direction along a first compression axis and the first side compression panel in a first horizontal direction along a second compression axis.

19 Claims, 3 Drawing Sheets

PANEL COMPRESSION SYSTEM FOR BALER IMPLEMENT

TECHNICAL FIELD

The disclosure generally relates to a baler implement, and more particularly to a baler implement having a compression chamber configured to form a bale having a parallelepiped shape.

BACKGROUND

Agricultural balers gather, compress, and shape crop material into a bale. There are different types of balers which create rectangular or square bales, or cylindrical or round bales. One exemplary baler is often referred to as a large square baler. Large square balers have been used in crop harvesting for many years, and utilize a compression system including a gearbox with a crank arm and connecting rod which are attached to a reciprocating plunger. During each rotation of the crank arm, the reciprocating plunger compresses the crop in a baling or compression chamber as the plunger moves towards the rear of the baler.

The compression chamber is generally formed by compression panels, e.g., an upper compression panel, a first side compression panel, a second side compression panel and a lower compression panel. The baler implement may include a compression system operable to urge one or more of the compression panels inward toward a center of the compression chamber. Doing so increases the pressure applied against the crop material disposed within the compression chamber, which in turn increases the resistance the crop material is able to apply against the plunger. Increasing the resistance against the plunger increases the density of the formed bale. Accordingly, the compression system may increase the density of the bale by pressing the compression panels inward. Typically, the compression system includes a hydraulic cylinder operable to extend to press against one or more of the compression panels.

SUMMARY

A baler implement for forming a bale having a parallelepiped shape is provided. The baler implement includes a main frame. An upper compression panel and a first side compression panel both partially form a compression chamber having a central longitudinal axis. A compression frame is attached to the main frame, is non-moveable relative to the main frame, and is disposed adjacent to the upper compression panel. Both the upper compression panel and the first side compression panel are moveable relative to both the main frame and the compression frame. A first upper pivot link contacts the upper compression panel and is rotatably coupled to the compression frame for rotation about a first upper link axis. A first side pivot link contacts the first side compression panel and is rotatably coupled to the main frame for rotation about a first side link axis. A first actuator interconnects the first upper pivot link and the first side pivot link. The first actuator is operable to extend and retract along a first actuator axis. retraction of the first actuator along the first actuator axis is operable to simultaneously move the upper compression panel in a first vertical direction along a first compression axis and the first side compression panel in a first horizontal direction along a second compression axis.

In one aspect of the disclosure, the first actuator axis is transverse to the central longitudinal axis. The first compression axis and the first actuator axis form a first angle therebetween. The second compression axis and the first actuator axis form a second angle therebetween. The first angle and the second angle are both acute angles and may both be between the range of ten degrees (10°) and eighty degrees (80°). In one implementation, the first angle is an acute angle between the range of forty-five degrees (45°) and eighty degrees (80°), and the second angle is an acute angle between the range of ten degrees (10°) and forty-five degrees (45°).

In one aspect of the disclosure, the first side pivot link includes a body extending from the first side link axis to a distal end. The first actuator is coupled to the first side pivot link proximate the distal end of the first side pivot link. The first side pivot link includes a protrusion positioned between the first side link axis and the distal end of the first side pivot link. The protrusion contacts the first side compression panel for sliding and/or rolling engagement therebetween. In one implementation, the protrusion includes a roller rotatably attached thereto and positioned for engaging the first side compression panel in rolling engagement to reduce friction therebetween.

In one aspect of the disclosure, the first upper pivot link includes a first leg portion extending from the first upper link axis to a first distal leg end. The first actuator is coupled to the first upper pivot link proximate the first distal leg end of the first upper pivot link. The first upper pivot link includes a second leg portion extending from the first upper link axis to a second distal leg end. The second distal leg end of the first upper pivot link contacts the upper compression panel for sliding and/or rolling engagement therebetween. The second distal leg end of the first upper pivot link may include a roller rotatably attached thereto and positioned for engaging the upper compression panel in rolling engagement to reduce friction therebetween.

In one aspect of the disclosure, the first upper link axis is disposed between the first distal leg end and the second distal leg end of the first upper pivot link. The first leg portion and the second leg portion of the first upper pivot link are arranged to form a link interior angle therebetween having a vertex at the first upper link axis. In one implementation of the disclosure, the link interior angle may be between the range of forty-five degrees (45°) and one hundred-thirty-five degrees (135°).

In one implementation of the disclosure, the first actuator may include, but is not limited to, a hydraulic cylinder operable to extend and retract in response to fluid pressure. In other implementations of the disclosure, the first actuator may include, but is not limited to, one of an electric actuator operable to extend and retract in response to an electric signal, or a pneumatic actuator operable to extend and retract in response to a pneumatic signal.

In one aspect of the disclosure, the baler implement includes a second side compression panel partially forming the compression chamber. The second side compression panel is moveable relative to both the main frame and the compression frame. A second upper pivot link contacts the upper compression panel and is rotatably coupled to the compression frame for rotation about a second upper link axis. A second side pivot link contacts the second side compression panel and is rotatably coupled to the main frame for rotation about a second side link axis. A second actuator interconnects the second upper pivot link and the second side pivot link. The second actuator is operable to extend and retract along a second actuator axis. Retraction of the second actuator along the second actuator axis is operable to simultaneously move the upper compression panel in the first vertical direction along the first compression axis and the second side compression panel in a second horizontal direction along the second compression axis. The second horizontal direction is opposite the first horizontal direction.

In one aspect of the disclosure, the second actuator axis is transverse to the central longitudinal axis. The first compression axis and the second actuator axis form a third angle therebetween. The second compression axis and the second actuator axis form a fourth angle therebetween. In one implementation, the third angle and the fourth angle are both acute angles between the range of ten degrees (10°) and eighty degrees (80°). In one implementation, the third angle is an acute angle between the range of forty-five degrees (45°) and eighty degrees (80°), and the fourth angle is an acute angle between the range of ten degrees (10°) and forty-five degrees (45°).

In one aspect of the disclosure, the second side pivot link includes a body extending from the second side link axis to a distal end. The second actuator is coupled to the second side pivot link proximate the distal end of the second side pivot link. The second side pivot link includes a protrusion positioned between the second side link axis and the distal end of the second side pivot link. The protrusion contacts the second side compression panel for sliding and/or rolling engagement therebetween. In one implementation, the protrusion includes a roller rotatably attached thereto and positioned for engaging the second side compression panel in rolling engagement to reduce friction therebetween.

In one aspect of the disclosure, the second upper pivot link includes a third leg portion extending from the second upper link axis to a third distal leg end. The second actuator is coupled to the second upper pivot link proximate the third distal leg end of the second upper pivot link. The second upper pivot link includes a fourth leg portion extending from the second upper link axis to a fourth distal leg end. The fourth distal leg end of the second upper pivot link contacts the upper compression panel for sliding and/or rolling engagement therebetween. The fourth distal leg end of the second upper pivot link may include a roller rotatably attached thereto and positioned for engaging the upper compression panel in rolling engagement to reduce friction therebetween.

In one aspect of the disclosure, the second upper link axis is disposed between the third distal leg end and the fourth distal leg end of the second upper pivot link. The third leg portion and the fourth leg portion of the second upper pivot link are arranged to form a link interior angle therebetween having a vertex at the second upper link axis. In one implementation of the disclosure, the link interior angle may be between the range of forty-five degrees (45°) and one hundred-thirty-five degrees (135°).

In one implementation of the disclosure, the second actuator may include, but is not limited to, a hydraulic cylinder operable to extend and retract in response to fluid pressure. In other implementations of the disclosure, the second actuator may include, but is not limited to, one of an electric actuator operable to extend and retract in response to an electric signal, or a pneumatic actuator operable to extend and retract in response to a pneumatic signal.

Accordingly, the baler implement described herein provides a simple yet strong, robust and effective compression system for compressing the compression panels inward into the compression chamber, with a minimum number of actuators, e.g., hydraulic cylinders, thereby minimizing the cost of the compression system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
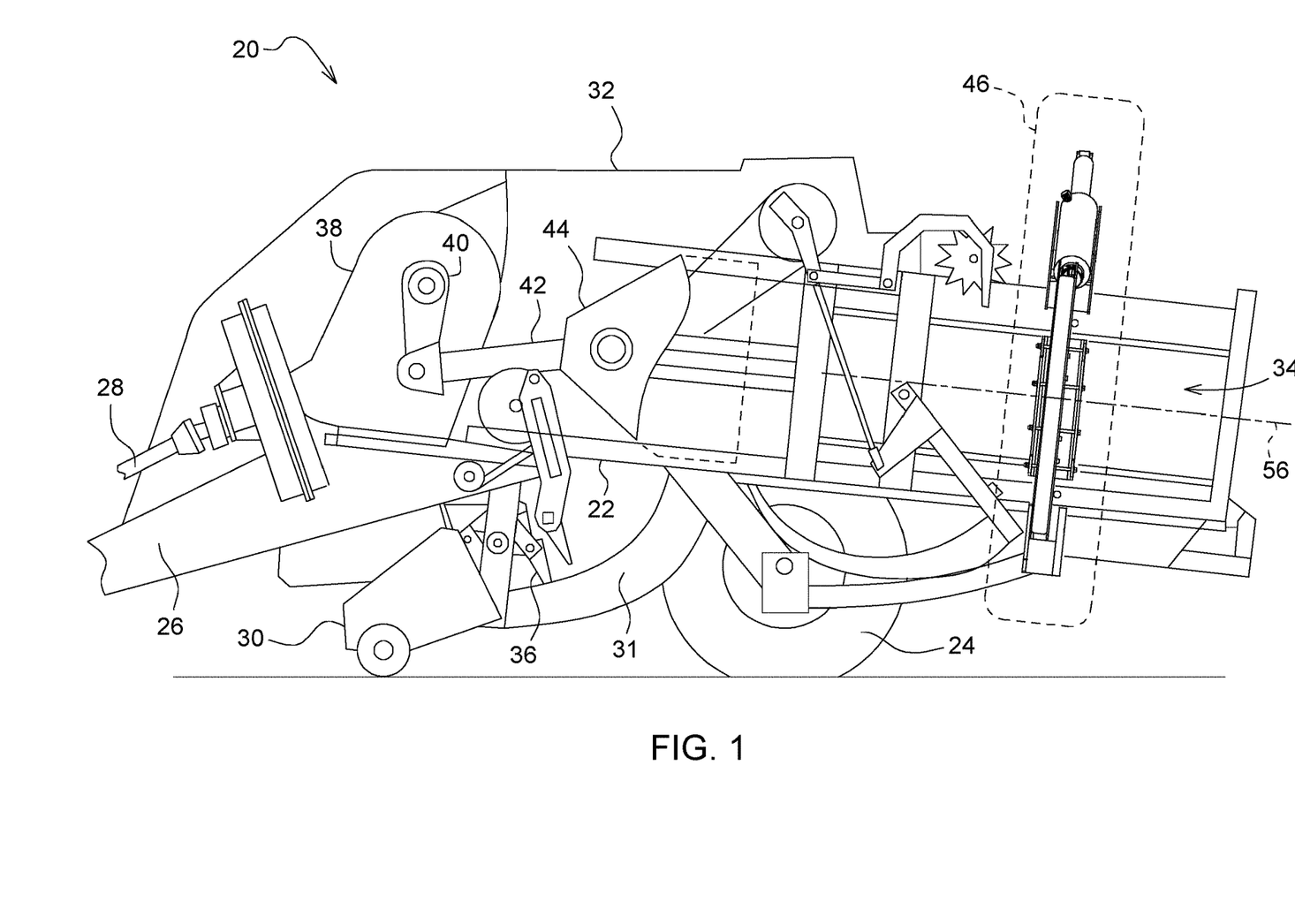
FIG. 1 is a schematic side view of a baler implement.

Referring to the Figures, wherein like numerals indicate like parts throughout the several views, a baler implement is generally shown at 20 in FIG. 1. Referring to FIG. 1 the baler implement 20 is shown as a large square baler. However, it should be appreciated that the teachings of this disclosure may be applied to other baler platforms, and are not limited to the exemplary embodiment of the large square baler shown in the Figures and described herein.

A traction unit, such as but not limited to a tractor, may be coupled to the baler implement 20 for pulling and powering the baler implement 20. However, it should be appreciated that in other implementations the baler implement 20 may be self-propelled. The baler implement 20 may move across a field to gather and process crop material to form a bale having a parallelepiped shape. The baler implement 20 may then eject the formed bale from the rear of the baler implement 20.

Referring to FIG. 1, the example implementation of the baler implement 20 includes a main frame 22, ground engaging devices 24, such as but not limited to wheels, tracks, slides, etc., a hitch 26 for attachment to the tractor or other vehicle, and an input shaft 28, such as a power-take-off (PTO) shaft, which can receive rotational power from a power source, such as the tractor. The baler implement 20 includes a pick-up mechanism 30 which gathers crop material from the ground surface and feeds it into a pre-compression passageway 31 of the baler implement 20. The pick-up mechanism 30 may include various pick-up apparatus including, but not limited to, tines, forks, augers, conveyors, baffles, a cutter or pre-cutter assembly, or any combination of the preceding. The baler implement 20 includes a housing 32 or body, which generally shields various internal components of the baler implement 20. The baler implement 20 includes multiple compression panels 48, 50, 52, 54 that form a compression chamber 34 used for forming the bale into the parallelepiped shape. A feeder system 36 moves the crop material from the pre-compression passageway 31 into the compression chamber 34 to form the bale.

The input shaft 28 or PTO shaft is connected to an input of a transmission 38 to provide rotational power to the baler implement 20 from the tractor or other associated vehicle or power source. The transmission 38 includes a gearbox which converts the rotational motion of the input shaft 28 along a generally longitudinal axis of the baler implement 20 to an output of the transmission 38 having a rotational motion along a generally transverse axis of the baler implement 20.

The baler implement 20 includes a crank arm 40 connected to the output of the transmission 38. A connecting link 42 interconnects the crank arm 40 and a plunger 44. The crank arm 40 rotates based upon the output of the transmission 38 and the plunger 44 moves in a reciprocal motion within the compression chamber 34 as the crank arm 40 rotates. The plunger 44 extends into the compression chamber 34, thereby compressing the crop material within the compression chamber 34, and then at least partially retracts from the compression chamber 34 to allow more crop material to enter the compression chamber 34.

With the plunger 44 in a fully retracted position, the feeder system 36 may move a charge of crop material from the pre-compression passageway 31 into the compression chamber 34, whereafter the plunger 44 moves to a fully extended position to compress the crop material. Each charge of the crop material forms a flake of the bale. Multiple flakes are accumulated together within the compression chamber 34 to form the bale. The plunger 44 compresses the crop material against the previously formed flakes disposed within the compression chamber 34. As such, the previously formed flakes provide the resistance against which the plunger 44 compresses the new crop material against. In order to increase the resistance against the plunger 44, the baler implement 20 may include a compression system 46 to compress the compression panels 48, 50, 52, 54 of the compression chamber 34 inward against the previously formed flakes disposed within the compression chamber 34.

As noted above, with reference to FIGS. 2-3, the compression chamber 34 is formed by a plurality of compression panels 48, 50, 52, 54. The plurality of compression panels 48, 50, 52, 54 may include an upper compression panel 48, a first side compression panel 50, a second side compression panel 52, and a lower compression panel 54. The compression chamber 34 defines a central longitudinal axis 56. The central longitudinal axis 56 of the compression chamber 34 may be defined as a horizontal and vertical centerline of the compression chamber 34, and defines the path of the bale as the bale is pressed through the compression chamber 34. The upper compression panel 48, the first side compression panel 50, the second side compression panel 52, and the lower side compression panel may be constructed for rigid components and materials as is understood by those skilled in the art. The size, shape and construction of the compression panels 48, 50, 52, 54 are understood by those skilled in the art, are not pertinent to the teachings of this disclosure, and are therefore not described in greater detail herein.

Figure 2:
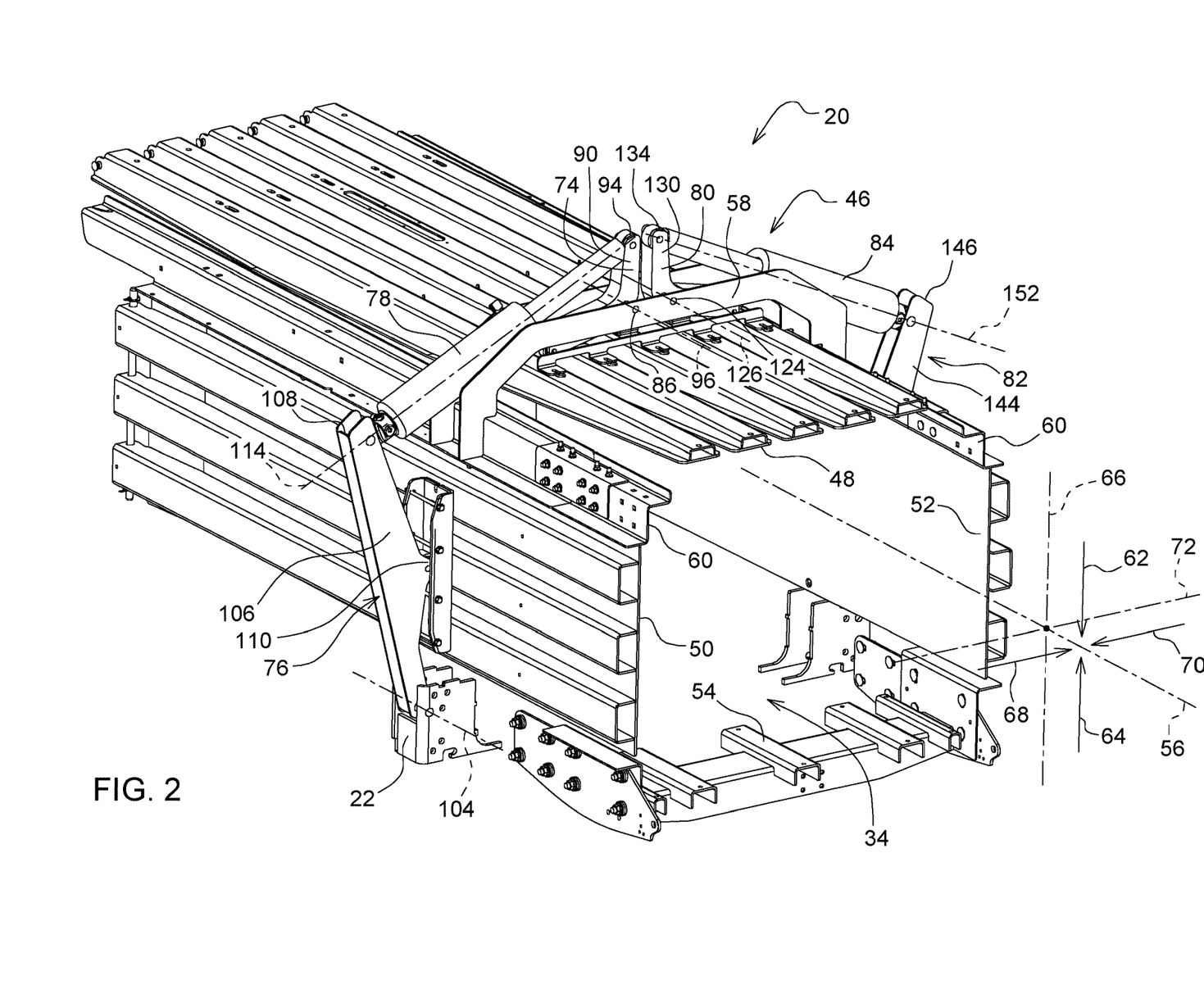
FIG. 2 is a schematic perspective view of a compression chamber of the baler implement.
Figure 3:
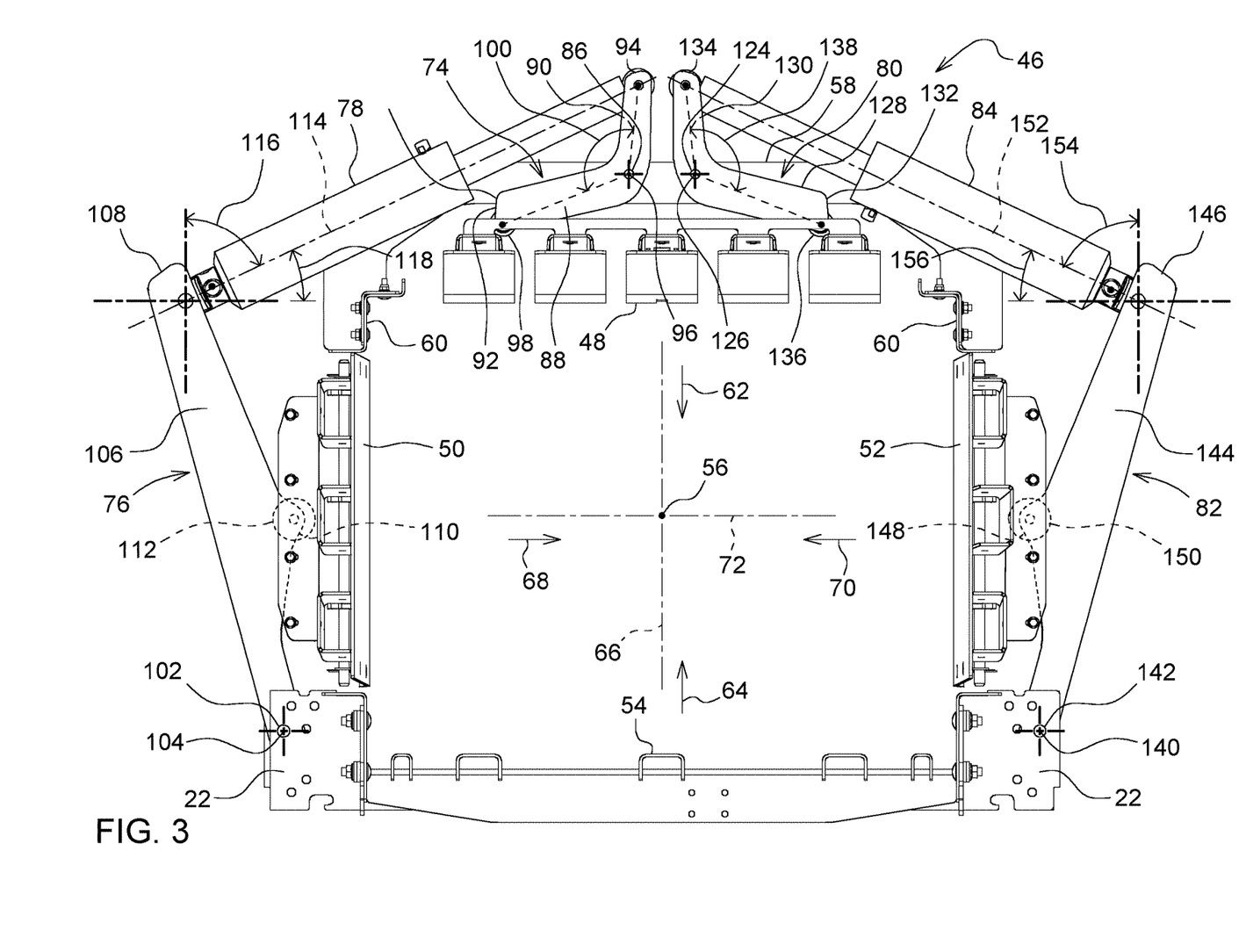
FIG. 3 is a schematic end view of a compression system of the baler implement.

Referring to FIGS. 2-3, a compression frame 58 is disposed above the upper compression panel 48. The compression frame 58 is rigidly attached to the main frame 22 of the baler implement 20. The compression frame 58 is fixed in position relative to the main frame 22 of the baler implement 20. The compression frame 58 is non-moveable relative to the main frame 22, and is disposed adjacent to and vertically above the upper compression panel 48. The compression frame 58 may be connected to the main frame 22 in a suitable manner, and may be connected via one or more other rigid components. For example, as shown in the Figures, the compression frame 58 is connected to a pair of upper rails 60 disposed along the top outer edges of the compression chamber 34. The upper rails 60 are attached to the main frame 22, thereby rigidly connecting the compression frame 58 to the main frame 22. It should be appreciated that the compression frame 58 may be connected to the main frame 22 in some other manner.

The upper compression panel 48 and at least one of the first side compression panel 50 and the second side compression panel 52 are moveable relative to both the main frame 22 and the compression frame 58. In the example implementation described herein and shown in the Figures, both the first side compression panel 50 and the second side compression panel 52 are movable relative to both the main frame 22 and the compression frame 58. Additionally, although not shown in the example implementation described herein, the lower compression panel 54 may be configured to be moveable relative to the compression frame 58 as well.

As best shown in FIG. 3, the upper compression panel 48 is moveable relative to the compression frame 58 in both a first vertical direction 62 and a second vertical direction 64 along a first compression axis 66. The first compression axis 66 is substantially orthogonal relative to the central longitudinal axis 56 of the compression chamber 34 and extends generally vertically. The first vertical direction 62 along the first compression axis 66 is defined herein as a vertically downward direction toward a ground surface. With respect to the upper compression panel 48, the first vertical direction 62 is generally inward toward the central longitudinal axis 56 of the compression chamber 34. The second vertical direction 64 along the first compression axis 66 is defined herein as a vertically upward direction away from the ground surface. With respect to the upper compression panel 48, the second vertical direction 64 is generally outward away from the central longitudinal axis 56 of the compression chamber 34. If the lower compression panel 54 is configured for movement, the lower compression chamber 34 may also be moveable relative to the compression frame 58 in both the first vertical direction 62 and the second vertical direction 64 along the first compression axis 66.

In the example implementation shown in the Figures and described herein, both the first side compression panel 50 and the second side compression panel 52 are moveable relative to the compression frame 58 in both a first horizontal direction 68 and a second horizontal direction 70 along a second compression axis 72. The first side compression panel 50 and the second side compression panel 52 are generally fixed in position relative to and do not move along the first compression axis 66. The upper compression panel 48 and the lower compression panel 54 are generally fixed in position relative to and do not move along the second compression axis 72.

As best shown in FIG. 3, the second compression axis 72 is substantially orthogonal relative to the central longitudinal axis 56 of the compression chamber 34 and extends generally horizontally. The first horizontal direction 68 along the second compression axis 72 is defined herein as a horizontally rightward direction as viewed on the page of the Figures. With respect to the first side compression panel 50, the first horizontal direction 68 is laterally inward toward the central longitudinal axis 56 of the compression chamber 34. With respect to the second side compression panel 52, the first horizontal direction 68 is laterally outward away from the central longitudinal axis 56 of the compression chamber 34. The second horizontal direction 70 along the second compression axis 72 is defined herein as a horizontally leftward direction as viewed on the page of the Figures. With respect to the first side compression panel 50, the second horizontal direction 70 is laterally outward away from the central longitudinal axis 56 of the compression chamber 34. With respect to the second side compression panel 52, the second horizontal direction 70 is laterally inward toward the central longitudinal axis 56 of the compression chamber 34.

As used herein, the terms "outboard" and "inboard" should be understood as a positional descriptors relative to the central longitudinal axis 56 of the compression chamber 34. An outboard position is located farther from the central longitudinal axis 56 than an inboard position. In contrast, an inboard position is located nearer the central longitudinal axis 56 than an outboard position.

As described above, the baler implement 20 includes the compression system 46 operable to press the compression panels 48, 50, 52, 54 inward toward the compression chamber 34 to increase frictional engagement between the compression panels 48, 50, 52, 54 and the previously formed flakes within the compression chamber 34, to thereby increase the density of the crop material compressed against the previously formed flakes.

Referring to FIGS. 2-3, the compression system 46 includes a first upper pivot link 74, a first side pivot link 76 and a first actuator 78, arranged on a first side of the compression chamber 34. The compression system 46 may further include a second upper pivot link 80, a second side pivot link 82 and a second actuator 84. As viewed on the page of the Figures and as described herein, the first side is the left side of the compression chamber 34, whereas the second side is the right side of the compression chamber 34. However, in should be appreciated that the relative positions of the first side and the second side may be reversed, such that the first side could alternatively be defined as the right side, and the second side could alternatively be defined as the left side.

The first upper pivot link 74 is disposed adjacent to and contacts the upper compression panel 48, and is rotatably coupled to the compression frame 58 by a first upper link connection 86 for rotation about a first upper link axis 96. The first upper link connection 86 may include a cylindrical connection, such as but not limited to a bolted connection, a pinned connection, a bushing, a bearing, etc., defining the first upper link axis 96.

In the example implementation shown in the Figures and described herein, the first upper pivot link 74 includes a first leg portion 88 and a second leg portion 90. The first leg portion 88 extends from the first upper link axis 96 to a first distal leg end 92. The first leg portion 88 extends from the first upper link axis 96 in a generally upward vertical direction, i.e., in the second vertical direction 64 along the first compression axis 66, whereby the first distal leg end 92 is spaced apart from and above the first upper link axis 96. The first actuator 78 is coupled to the first upper pivot link 74 proximate the first distal leg end 92 of the first upper pivot link 74. The second leg portion 90 extends from the first upper link axis 96 to a second distal leg end 94. The second leg portion 90 extends from the first upper link axis 96 in a generally outboard horizontal direction, i.e., in the second horizontal direction 70 along the second compression axis 72, whereby the second distal leg end 94 is spaced apart from and outboard of the first upper link axis 96.

The second distal leg end 94 of the second leg portion 90 of the first upper pivot link 74 is disposed in contacting engagement with the upper compression panel 48. The second distal leg end 94 moves linearly along the upper compression panel 48 during operation of the compression system 46. The second distal leg end 94 may slide against the upper compression panel 48. However, in other implementations, the second distal leg end 94 of the first upper pivot link 74 may include a roller 98 rotatably attached thereto and positioned for engaging the upper compression panel 48 in rolling engagement. The rolling engagement between the roller 98 and the upper compression panel 48 may reduce friction between the second distal leg end 94 and the upper compression panel 48 during relative movement therebetween.

The first distal leg end 92 and the second distal leg end 94 are arranged relative to the first upper link axis 96 to form two legs of a triangle with the first upper link axis 96 disposed between the first distal leg end 92 and the second distal leg end 94 of the first upper pivot link 74. The first leg portion 88 and the second leg portion 90 of the first upper pivot link 74 are arranged to form a link interior angle 100 therebetween having a vertex at the first upper link axis 96. In one example implementation, the link interior angle 100 may include a value between the range of forty-five degrees (45°) and one hundred-thirty-five degrees (135°). However, it should be appreciated that the link interior angle 100 may vary from the example range described herein.

The first side pivot link 76 contacts the first side compression panel 50 and is rotatably coupled to the main frame 22 by a first side link connection 102 for rotation about a first side link axis 104. The first side link connection 102 may include a cylindrical connection, such as but not limited to a bolted connection, a pinned connection, a bushing, a bearing, etc., defining the first side link axis 104.

In the example implementation shown in the Figures and described herein, the first side pivot link 76 includes a body 106 extending from the first side link axis 104 to a distal end 108. The first actuator 78 is coupled to the first side pivot link 76 proximate the distal end 108 of the first side pivot link 76. The distal end 108 of the body 106 of the first side pivot link 76 is disposed vertically above and outboard of the first side link axis 104.

The first side pivot link 76 includes a protrusion 110 positioned between the first side link axis 104 and the distal end 108 of the first side pivot link 76. The protrusion 110 is positioned vertically above the first side link axis 104, and below the distal end 108 of the body 106 of the first side pivot link 76. Additionally, the distal end 108 of the body 106 of the first side pivot link 76 is positioned outboard of the protrusion 110. The protrusion 110 contacts the first side compression panel 50. During operation of the compression system 46, the protrusion 110 may slide or roll against the first side compression panel 50. In order to reduce friction between the protrusion 110 of the first side pivot link 76 and the first side compression panel 50, the protrusion 110 may include a roller 112 rotatably attached thereto and positioned for engaging the first side compression panel 50 in rolling engagement.

The first actuator 78 interconnects the first upper pivot link 74 and the first side pivot link 76. The first actuator 78 is operable to extend and retract along a first actuator axis 114. The first actuator axis 114 is transverse to the central longitudinal axis 56. The first compression axis 66 and the first actuator axis 114 form a first angle 116 therebetween. The second compression axis 72 and the first actuator axis 114 form a second angle 118 therebetween. In one example implementation, the first angle 116 and the second angle 118 are both acute angles between the range of ten degrees (10°) and eighty degrees (80°). More particularly, the first angle 116 may be an acute angle between the range of forty-five degrees (45°) and eighty degrees (80°), and the second angle 118 may be an acute angle between the range of ten degrees (10°) and forty-five degrees (45°). It should be appreciated that the values of the first angle 116 and the second angle 118 may differ from the example ranges provided herein.

As noted above, the first actuator 78 is operable to extend and retract along the first actuator axis 114. In one implementation, the first actuator 78 may include a hydraulic cylinder operable to extend and retract in response to fluid pressure. However, it should be appreciated that the first actuator 78 may include some other device capable of extending and retracting in response to some other form of control signal. For example, the first actuator 78 may include, but is not limited to, an electric actuator operable to extend and retract in response to an electric controls signal, or a pneumatic actuator operable to extend and retract in response to a pneumatic control signal. Additionally, it should be appreciated that the first actuator 78 may include other components, linkage systems, force multiplying mechanical systems, etc. to generate the linear movement during extension and retraction.

During operation of the compression system 46, retraction of the first actuator 78 along the first actuator axis 114 is operable to simultaneously move the upper compression panel 48 in the first vertical direction 62 along the first compression axis 66 and the first side compression panel 50 in the first horizontal direction 68 along the second compression axis 72. More particularly, retraction of the first actuator 78 along the first actuator axis 114 causes rotation of the first upper pivot link 74 about the first upper link axis 96 in a counter-clockwise direction as viewed on the page of the Figures, which moves the first distal leg end 92 of the first upper pivot link 74 outward away from of the first compression axis 66, which in turn causes the second distal leg end 94 of the first upper pivot link 74 to move downward toward the compression chamber 34. This motion biases and/or moves the upper compression panel 48 downward toward the compression chamber 34, in the first vertical direction 62 along the first compression axis 66. Simultaneously, retraction of the first actuator 78 along the first actuator axis 114 causes rotation of the distal end 108 of the body 106 of the first side pivot link 76 about the first side link axis 104 in a clockwise direction as viewed on the page of the Figures, which moves the distal end 108 of the body 106 of the first side pivot link 76 inward toward the first compression axis 66, which in turn cause the protrusion 110 of the body 106 of the first side pivot link 76 to move inboard toward the compression chamber 34. The motion biases and/or moves the first side compression panel 50 inward toward the compression chamber 34, in the first horizontal direction 68 along the second compression axis 72.

Extension of the first actuator 78 along the first actuator axis 114 operates in reverse of the motion described above. Accordingly, it should be understood that extension of the first actuator 78 along the first actuator axis 114 allows the upper compression panel 48 to move upward in the second vertical direction 64 along the first compression axis 66, and the allows the first side compression panel 50 to move outward in the second horizontal direction 70 along the second compression axis 72.

The second upper pivot link 80 is disposed adjacent to and contacts the upper compression panel 48, and is rotatably coupled to the compression frame 58 by a second upper link connection 124 for rotation about a second upper link axis 126. The second upper link connection 124 may include a cylindrical connection, such as but not limited to a bolted connection, a pinned connection, a bushing, a bearing, etc., defining the first upper link axis 96.

In the example implementation shown in the Figures and described herein, the second upper pivot link 80 includes a first leg portion 128 and a second leg portion 130. The first leg portion 128 extends from the second upper link axis 126 to a first distal leg end 132. The first leg portion 128 extends from the second upper link axis 126 in a generally upward vertical direction, i.e., in the second vertical direction 64 along the first compression axis 66, whereby the first distal leg end 132 is spaced apart from and above the second upper link axis 126. The second actuator 84 is coupled to the second upper pivot link 80 proximate the first distal leg end 132 of the second upper pivot link 80. The second leg portion 130 extends from the second upper link axis 126 to a second distal leg end 134. The second leg portion 130 extends from the second upper link axis 126 in a generally outboard horizontal direction, i.e., in the second horizontal direction 70 along the second compression axis 72, whereby the second distal leg end 134 is apart from and outboard of the second upper link axis 126.

The second distal leg end 134 of second leg portion 130 of the second upper pivot link 80 is disposed in contacting engagement with the upper compression panel 48. The second distal leg end 134 moves linearly along the upper compression panel 48 during operation of the compression system 46. The second distal leg end 134 may slide against the upper compression panel 48. However, in other implementations, the second distal leg end 134 of the second upper pivot link 80 may include a roller 136 rotatably attached thereto and positioned for engaging the upper compression panel 48 in rolling engagement. The rolling engagement between the roller 136 and the upper compression panel 48 may reduce friction between the second distal leg end 134 and the upper compression panel 48 during relative movement therebetween.

The first distal leg end 132 and the second distal leg end 134 are arranged relative to the second upper link axis 126 to form two legs of a triangle with the second upper link axis 126 disposed between the first distal leg end 132 and the second distal leg end 134 of the second upper pivot link 80. The first leg portion 128 and the second leg portion 130 of the second upper pivot link 80 are arranged to form a link interior angle 138 therebetween having a vertex at the second upper link axis 126. In one example implementation, the link interior angle 138 may include a value between the range of forty-five degrees (45°) and one hundred-thirty-five degrees (135°). However, it should be appreciated that the link interior angle 138 may vary from the example range described herein.

The second side pivot link 82 contacts the first side compression panel 50 and is rotatably coupled to the main frame 22 by a second side link connection 140 for rotation about a second side link axis 142. The second side link connection 140 may include a cylindrical connection, such as but not limited to a bolted connection, a pinned connection, a bushing, a bearing, etc., defining the second side link axis 142.

In the example implementation shown in the Figures and described herein, the second side pivot link 82 includes a body 144 extending from the second side link axis 142 to a distal end 146. The second actuator 84 is coupled to the second side pivot link 82 proximate the distal end 146 of the second side pivot link 82. The distal end 146 of the body 144 of the second side pivot link 82 is disposed vertically above and outboard of the second side link axis 142.

The second side pivot link 82 includes a protrusion 148 positioned between the second side link axis 142 and the distal end 146 of the second side pivot link 82. The protrusion 148 is positioned vertically above the second side link axis 142, and below the distal end 146 of the body 144 of the second side pivot link 82. Additionally, the distal end 146 of the body 144 of the second side pivot link 82 is positioned outboard of the protrusion 148. The protrusion 148 contacts the second side compression panel 52. During operation of the compression system 46, the protrusion 148 may slide or roll against the second side compression panel 52. In order to reduce friction between the protrusion 148 of the second side pivot link 82 and the second side compression panel 52, the protrusion 148 may include a roller 150 rotatably attached thereto and positioned for engaging the second side compression panel 52 in rolling engagement.

The second actuator 84 interconnects the second upper pivot link 80 and the second side pivot link 82. The second actuator 84 is operable to extend and retract along a second actuator axis 152. The second actuator axis 152 is transverse to the central longitudinal axis 56. The first compression axis 66 and the second actuator axis 152 form a third angle 154 therebetween. The second compression axis 72 and the second actuator axis 152 form a fourth angle 156 therebetween. In one example implementation, the third angle 154 and the fourth angle 156 are both acute angles between the range of ten degrees (10°) and eighty degrees (80°). More particularly, the third angle 154 may be an acute angle between the range of forty-five degrees (45°) and eighty degrees (80°), and the fourth angle 156 may be an acute angle between the range of ten degrees (10°) and forty-five degrees (45°). It should be appreciated that the values of the third angle 154 and the fourth angle 156 may differ from the example ranges provided herein.

As noted above, the second actuator 84 is operable to extend and retract along the second actuator axis 152. In one implementation, the second actuator 84 may include a hydraulic cylinder operable to extend and retract in response to fluid pressure. However, it should be appreciated that the second actuator 84 may include some other device capable of extending and retracting in response to some other form of control signal. For example, the second actuator 84 may include, but is not limited to, an electric actuator operable to extend and retract in response to an electric controls signal, or a pneumatic actuator operable to extend and retract in response to a pneumatic control signal. Additionally, it should be appreciated that the second actuator 84 may include other components, linkage systems, force multiplying mechanical systems, etc. to generate the linear movement during extension and retraction.

During operation of the compression system 46, retraction of the second actuator 84 along the second actuator axis 152 is operable to simultaneously move the upper compression panel 48 in the first vertical direction 62 along the first compression axis 66 and the second side compression panel 52 in a second horizontal direction 70 along the second compression axis 72. More particularly, retraction of the second actuator 84 along the second actuator axis 152 causes rotation of the second upper pivot link 80 about the second upper link axis 126 in a clockwise direction as viewed on the page of the Figures, which moves the first distal leg end 132 of the second upper pivot link 80 outward away from of the first compression axis 66, which in turn causes the second distal leg end 134 of the second upper pivot link 80 to move downward toward the compression chamber 34. This motion biases and/or moves the upper compression panel 48 downward toward the compression chamber 34, in the first vertical direction 62 along the first compression axis 66. Simultaneously, retraction of the second actuator 84 along the second actuator axis 152 causes rotation of the distal end 146 of the body 144 of the second side pivot link 82 about the second side link axis 142 in a counter-clockwise direction as viewed on the page of the Figures, which moves the distal end 146 of the body 144 of the second side pivot link 82 inward toward the first compression axis 66, which in turn cause the protrusion 148 of the body 144 of the second side pivot link 82 to move inboard toward the compression chamber 34. The motion biases and/or moves the second side compression panel 52 inward toward the compression chamber 34, in the second horizontal direction 70 along the second compression axis 72.

Extension of the second actuator 84 along the second actuator axis 152 operates in reverse of the motion described above. Accordingly, it should be understood that extension of the second actuator 84 along the first actuator axis 114 allows the upper compression panel 48 to move upward in the second vertical direction 64 along the first compression axis 66, and the allows the second side compression panel 52 to move outward in the first horizontal direction 68 along the second compression axis 72.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement for forming a bale having a parallelepiped shape, the baler implement comprising:
   a main frame;
   an upper compression panel and a first side compression panel both partially forming a compression chamber having a central longitudinal axis;
   a compression frame attached to the main frame, non-moveable relative to the main frame, and disposed adjacent to the upper compression panel;
   wherein both the upper compression panel and the first side compression panel are moveable relative to both the main frame and the compression frame;

a first upper pivot link contacting the upper compression panel and rotatably coupled to the compression frame for rotation about a first upper link axis;
a first side pivot link contacting the first side compression panel and rotatably coupled to the main frame for rotation about a first side link axis;
a first actuator interconnecting the first upper pivot link and the first side pivot link and operable to extend and retract along a first actuator axis, wherein retraction of the first actuator along the first actuator axis is operable to simultaneously move the upper compression panel in a first vertical direction along a first compression axis and the first side compression panel in a first horizontal direction along a second compression axis;
wherein the first actuator axis is transverse to the central longitudinal axis;
wherein the first compression axis and the first actuator axis form a first angle therebetween; and
wherein the second compression axis and the first actuator axis form a second angle therebetween.

2. The baler implement set forth in claim 1, wherein the first angle and the second angle are both acute angles between the range of ten degrees (10°) and eighty degrees (80°).

3. The baler implement set forth in claim 1, wherein the first angle is an acute angle between the range of forty-five degrees (45°) and eighty degrees (80°), and wherein the second angle is an acute angle between the range of ten degrees (10°) and forty-five degrees (45°).

4. The baler implement set forth in claim 1, wherein the first side pivot link includes a body extending from the first side link axis to a distal end, with the first actuator coupled to the first side pivot link proximate the distal end of the first side pivot link.

5. The baler implement set forth in claim 4, wherein the first side pivot link includes a protrusion positioned between the first side link axis and the distal end of the first side pivot link, with the protrusion contacting the first side compression panel.

6. The baler implement set forth in claim 5, wherein the protrusion includes a roller rotatably attached thereto positioned for engaging the first side compression panel in rolling engagement.

7. The baler implement set forth in claim 1, wherein the first upper pivot link includes a first leg portion extending from the first upper link axis to a first distal leg end, with the first actuator coupled to the first upper pivot link proximate the first distal leg end of the first upper pivot link.

8. The baler implement set forth in claim 7, wherein the first upper pivot link includes a second leg portion extending from the first upper link axis to a second distal leg end, with the second leg portion of the first upper pivot link contacting the upper compression panel.

9. The baler implement set forth in claim 8, wherein the first upper link axis is disposed between the first distal leg end and the second distal leg end of the first upper pivot link.

10. The baler implement set forth in claim 8, wherein the first leg portion and the second leg portion of the first upper pivot link are arranged to form a link interior angle therebetween having a vertex at the first upper link axis, wherein the link interior angle is between the range of forty-five degrees (45°) and one hundred-thirty-five degrees (135°).

11. The baler implement set forth in claim 8, wherein the second distal leg end of the first upper pivot link includes a roller rotatably attached thereto and positioned for engaging the upper compression panel in rolling engagement.

12. The baler implement set forth in claim 1, wherein the first actuator includes a hydraulic cylinder operable to extend and retract in response to fluid pressure.

13. The baler implement set forth in claim 1, further comprising a second side compression panel partially forming the compression chamber and moveable relative to both the main frame and the compression frame.

14. The baler implement set forth in claim 13, further comprising:
a second upper pivot link contacting the upper compression panel and rotatably coupled to the compression frame for rotation about a second upper link axis;
a second side pivot link contacting the second side compression panel and rotatably coupled to the main frame for rotation about a second side link axis; and
a second actuator interconnecting the second upper pivot link and the second side pivot link and operable to extend and retract along a second actuator axis, wherein retraction of the second actuator along the second actuator axis is operable to simultaneously move the upper compression panel in the first vertical direction along the first compression axis and the second side compression panel in a second horizontal direction along the second compression axis.

15. The baler implement set forth in claim 14, wherein the second actuator axis is transverse to the central longitudinal axis, wherein the first compression axis and the second actuator axis form a third angle therebetween, and wherein the second compression axis and the second actuator axis form a fourth angle therebetween.

16. The baler implement set forth in claim 15, wherein the third angle and the fourth angle are both acute angles between the range of ten degrees (10°) and eighty degrees (80°).

17. The baler implement set forth in claim 14, wherein the second side pivot link includes a body extending from the second side link axis to a distal end, with the second actuator coupled to the second side pivot link proximate the distal end of the second side pivot link.

18. The baler implement set forth in claim 17, wherein the second side pivot link includes a protrusion positioned between the second side link axis and the distal end of the second side pivot link, with the protrusion contacting the second side compression panel.

19. A baler implement for forming a bale having a parallelepiped shape, the baler implement comprising:
a main frame;
an upper compression panel, a first side compression panel and a second side compression panel all partially forming a compression chamber having a central longitudinal axis;
a compression frame attached to the main frame, non-moveable relative to the main frame, and disposed adjacent to the upper compression panel;
wherein all of the upper compression panel, the first side compression panel and the second side compression panel are moveable relative to both the main frame and the compression frame;
a first upper pivot link contacting the upper compression panel and rotatably coupled to the compression frame for rotation about a first upper link axis;
a second upper pivot link contacting the upper compression panel and rotatably coupled to the compression frame for rotation about a second upper link axis;
a first side pivot link contacting the first side compression panel and rotatably coupled to the main frame for rotation about a first side link axis;

a second side pivot link contacting the second side compression panel and rotatably coupled to the main frame for rotation about a second side link axis;

a first actuator interconnecting the first upper pivot link and the first side pivot link and operable to extend and retract along a first actuator axis, wherein retraction of the first actuator along the first actuator axis is operable to simultaneously move the upper compression panel in a first vertical direction along a first compression axis and the first side compression panel in a first horizontal direction along a second compression axis;

wherein the first side pivot link includes a body extending from the first side link axis to a distal end, with the first actuator coupled to the first side pivot link proximate the distal end of the first side pivot link;

wherein the first side pivot link includes a protrusion positioned between the first side link axis and the distal end of the first side pivot link, with the protrusion contacting the first side compression panel;

a second actuator interconnecting the second upper pivot link and the second side pivot link and operable to extend and retract along a second actuator axis, wherein retraction of the second actuator along the second actuator axis is operable to simultaneously move the upper compression panel in the first vertical direction along the first compression axis and the second side compression panel in a second horizontal direction along the second compression axis;

wherein the second side pivot link includes a body extending from the second side link axis to a distal end, with the second actuator coupled to the second side pivot link proximate the distal end of the second side pivot link; and wherein the second side pivot link includes a protrusion positioned between the second side link axis and the distal end of the second side pivot link, with the protrusion contacting the second side compression panel.

* * * * *